United States Patent [19]

Schaffer et al.

[11] Patent Number: 4,996,515
[45] Date of Patent: Feb. 26, 1991

[54] APPARATUS FOR SUPPRESSING AUTOMOBILE ANTI-THEFT ARM/DISARM SYSTEM

[76] Inventors: Michael Schaffer, 5061 63rd St., San Diego, Calif. 92115; Gerald J. Teudt, 5447 Por Techo Ct., San Diego, Calif. 92124

[21] Appl. No.: 510,603
[22] Filed: Apr. 18, 1990
[51] Int. Cl.$^5$ .............................................. B60R 25/10
[52] U.S. Cl. ..................................... 340/426; 340/502; 307/10.2
[58] Field of Search ................ 340/426, 427, 428, 429, 340/527, 539, 502; 307/10.2; 341/176

[56] References Cited

U.S. PATENT DOCUMENTS

| | | | |
|---|---|---|---|
| 4,383,242 | 5/1983 | Sassover et al. | 340/429 X |
| 4,691,801 | 9/1987 | Mann et al. | 180/287 |
| 4,794,368 | 12/1988 | Grossheim et al. | 340/692 X |
| 4,866,417 | 9/1989 | DeFino et al. | 340/429 |
| 4,885,572 | 12/1989 | Iwata et al. | 340/425.5 |

OTHER PUBLICATIONS

Crimestopper Security Products, Inc., HP7508 Stiletto ™ Digital Remote Alarm System, Installation Instructions, pp. 1-37.

Viper Auto Security, Model 300, Installation Guide, pp. 1-8.

XT Plus Code-Alarm, Micro-Processor Controlled Vehicle Security System With Remote Control Micro-Mitter, Installation Instructions, pp. 1-13.

Crimestopper Security Products, Inc. Hi-Pro Security Products, HP8710, Remote Alarm System, Installation Instructions, pp. 1-43.

Primary Examiner—Joseph A. Orsino
Assistant Examiner—Jeffery A. Hofsass
Attorney, Agent, or Firm—Nydegger & Associates

[57] ABSTRACT

An apparatus for automatically suppressing the audible arm and disarm signal associated with an automobile anti-theft system includes a control circuit connected between an anti-theft system and its sound emitter. A photoresistor cell is connected to the control circuit to indicate whether the light level is above or below a threshold level, e.g. to distinguish day from night. In the day, the control circuit is bypassed and the system functions normally. At night, the control circuit suppresses the system signal for a short interval, e.g. two seconds, to eliminate the audible arm and disarm signal. The short suppression interval does not significantly interfere with an intruder alarm signal.

8 Claims, 1 Drawing Sheet

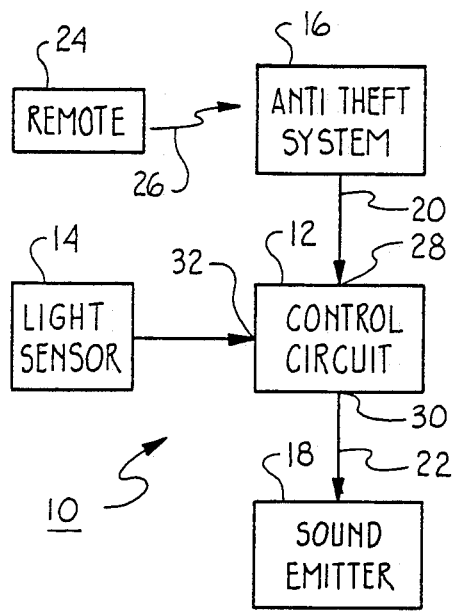
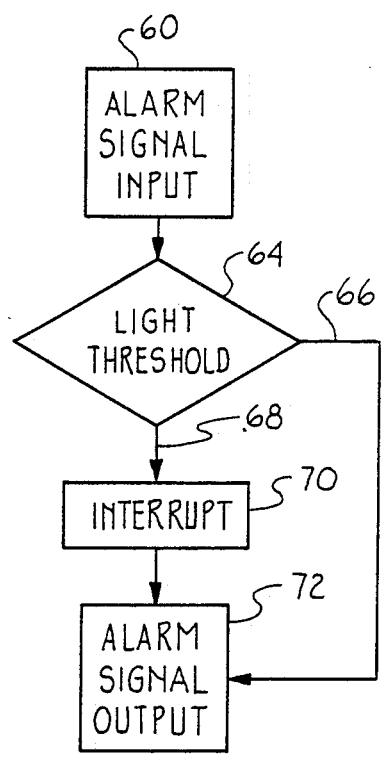
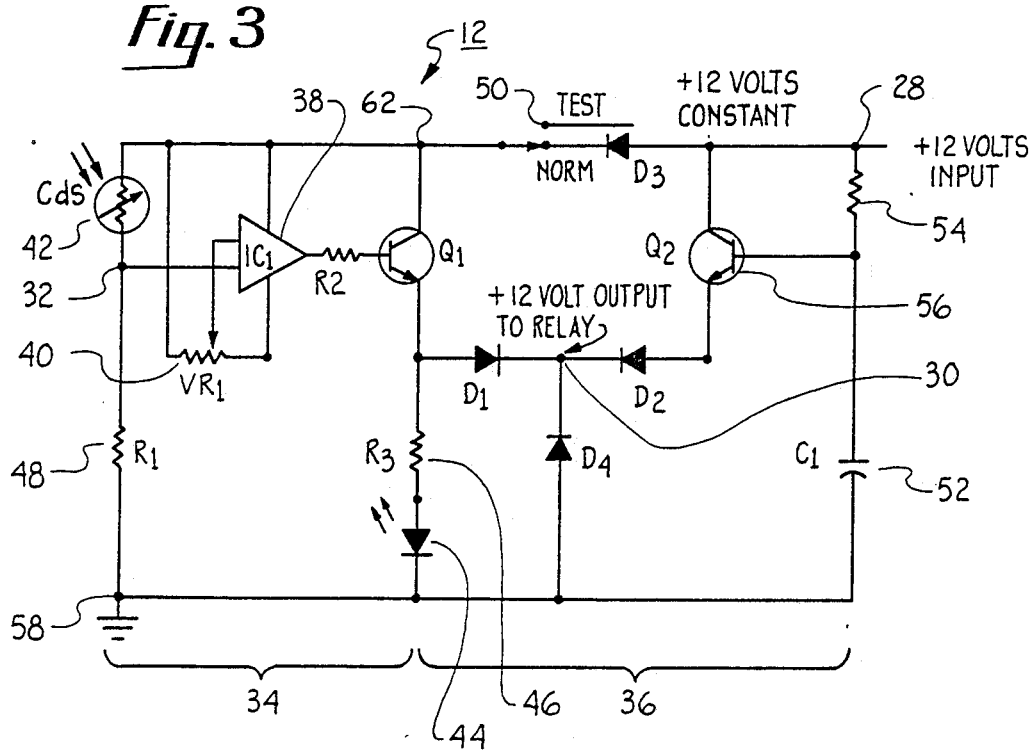

APPARATUS FOR SUPPRESSING AUTOMOBILE ANTI-THEFT ARM/DISARM SYSTEM

FIELD OF THE INVENTION

This invention relates generally to anti-theft alarm systems. In particular, this invention relates to systems for detecting an intrusion into a secured area and sounding an alarm in response to the intrusion. This invention is particularly, though not exclusively, useful for suppressing the audible arm and disarm signals of an automobile anti-theft alarm system.

BACKGROUND OF THE INVENTION

In recent years there have been introduced many automobile anti-theft alarm systems for deterring theft of automobiles. Such anti-theft alarm systems include a sensing mechanism for detecting an intrusion. The sensing mechanism is connected to a control circuit for indicating an alarm condition signal in response to an intrusion. The alarm condition signal then energizes an audible alarm, siren, or other sound emitting device. These automobile anti-theft alarm systems are typically activated by the driver after the driver has parked the automobile, locked it, and left. There are also passive alarm systems which arm themselves after some predetermined time period after the vehicle is turned off and all doors are closed. The automobile anti-theft alarm system typically includes a vehicle pin switch or shock sensor to detect a door opening, or motion sensor or glass breaking sound detector which detects any unauthorized motion or harm to the parked vehicle, such as would occur when an intruder is attempting to enter the vehicle, such as by breaking the window or picking a lock, or when the user gets into the vehicle. This intrusion sensor sends a signal to emit an alarm. Typical anti-theft alarm systems can be connected to the existing automobile horn of the vehicle, or can have their own separate siren installed which may be powered either by the battery of the automobile or an additional internal battery. The sound emitting device is typically mounted under the locked hood or trunk of the vehicle. In addition, the alarm control circuit is typically installed also within a secured area of the vehicle, such as under the dash board of the car.

To arm and disarm the anti-theft alarm system, it is important that the user be physically removed from the vehicle so that the user does not set off an alarm condition when arming or activating the system. Accordingly, some systems use a hand-held remote control unit which communicates with the alarm control circuit installed in the vehicle to activate and arm the system to detect intrusions. Also, passive alarm systems arm themselves as mentioned above. These remote control units arm and disarm the anti-theft system by transmitting a signal to the system installed in the automobile. To notify and acknowledge to the user that the system has indeed been armed or disarmed, virtually all remote and passive alarming systems include a notification feature whereby receipt of the remote control signal causes the alarm sound emitting device to generate a short, loud burst of sound, sometimes referred to as a chirp. Typically, such chirps are essentially of a short, predetermined duration of about one to one and one-half seconds of energizing of the sound emitting device of the anti-theft system, typically at the same intensity or volume as an alarm condition. Consequently, this loud chirp, although of relatively short duration, can become very annoying to others who may be within the vicinity of the automobile.

While this nuisance is something which can perhaps be tolerated during the daylight hours, it can become extremely troublesome when the anti-theft system is armed or disarmed at night. This is especially true when people return home in the evening and park their car at their house or apartment parking lot, and arm the anti-theft system in their car for the night. Depending on the time of the evening, many people within hearing range may be awakened by the arm chirp. This is especially true in apartment complexes when there are many cars parked outside the windows of people who may be trying to sleep at night. It is also an annoyance which can be heard through the walls of a typical house, which may include a garage which may have other people or children in the house sleeping. It may also awaken people in the morning when the anti-theft system is disarmed to allow the driver to use the vehicle. On the other hand, to fail to arm the vehicle is not acceptable since many automobile and automobile accessory thefts occur at night. Also, some systems allow manual disabling of the arm/disarm chirp, but it disables it at all times, day or night.

In light of the foregoing, it is therefore an object of the present invention to provide an apparatus which automatically suppresses the audible arm and disarm chirps of a remote control automobile anti-theft system. It is another object of the present invention to provide an apparatus for automatically suppressing the arm and disarm chirp during the evening. It is yet another object of the present invention to provide an apparatus for suppressing an audible arm and disarm chirp which apparatus is durable and reliable in its operation. It is still another object of the present invention to provide an apparatus for suppressing an audible arm and disarm chirp which is cost-effective in its manufacture and simple and convenient to use.

SUMMARY OF THE INVENTION

The device for suppressing the audible arm and disarm signal of an automobile anti-theft system comprises a control circuit which is incorporated into an anti-theft system between the alarm signal generating portion and the alarm sound emitting device. The control circuit has an input for receiving an alarm signal from the alarm signal generating portion, and an output for providing a modified alarm signal to the sound emitting device. A light sensing transducer is connected to the circuit for generating a light level signal which indicates whether the ambient light intensity impinging on the transducer is above or below a certain threshold level. The light sensing transducer is preferably a cadmium sulfide photoresistor cell mounted inside the vehicle near the windshield to pick up ambient light levels surrounding the vehicle. The control circuit includes a bypass switch and a signal suppression switch. The bypass switch is activated when the light level signal is above the threshold level to bypass the suppression switch to directly connect the alarm signal to the sound emitting apparatus. The suppression switch is activated when the light level signal is below the threshold level to suppress the alarm signal to the sound emitting device for a predetermined period of delay. In the preferred embodiment, the delay period is slightly greater than the duration of a typical arm/disarm chirp of the automobile anti-theft system, i.e. up to two (2) seconds.

The novel features of this invention, as well as the invention itself, both as to its structure and its operation, will be best understood from the accompanying drawings, taken in conjunction with the accompanying description, in which similar reference characters refer to similar parts, and in which:

BRIEF DESCRIPTION OF THE DRAWINGS

FIG. 1 is a block diagram showing a preferred embodiment of the automatic alarm suppression device incorporated into a vehicle anti-theft system in accordance with the present invention;

FIG. 2 is a block diagram showing the operation of the automatic alarm suppression apparatus of the present invention; and FIG. 3 is a circuit diagram of the circuit contained in the automatic alarm suppression apparatus according to the present invention.

DETAILED DESCRIPTION OF THE PREFERRED EMBODIMENT

Referring to FIG. 1, there is shown the apparatus for automatically suppressing an alarm, generally designated 10, being shown in its intended environment. In particular, apparatus 10 comprises a control circuit 12 to which is connected a transducer 14, which generates electrical signals representative of the intensity of light impinging on transducer 14. Control circuit 12 is shown incorporated into the line connecting anti-theft system 16 to its associated sound emitting device 18, such as the automobile horn, or a siren installed within the vehicle. In particular, anti-theft system 16 typically comprises a conventional electronic circuit which includes a motion detector or some other sensing mechanism for generating an electrical alarm signal when there is an intrusion into the automobile or other vehicle. The alarm signal 20 is typically a twelve (12) volt signal transmitted along the line to a sound emitter 18, but the circuit can also be adapted to accept a ground signal as the alarm signal. In a conventional anti-theft system 16, alarm signal 20 is the same as the signal on the connector 22 which serves as input to the sound emitter 18. Sound emitter 18 can be connected to the automobile horn under the hood of the vehicle, or to a separate alarm siren installed as desired. The sound emitting device 18 is typically any kind of device which can generate a loud sound for indicating an intrusion has occurred as indicated by the anti-theft system 16. Anti-theft system 16 further includes a remote control 24 which is a portable transmitter for transmitting an arm signal 26 to anti-theft system 16 for arming and disarming the system, remote from the vehicle.

Control circuit 12 of the apparatus 10 of the present invention is mounted in a convenient location, typically under the dashboard of the vehicle, along with the anti-theft system 16. Control circuit 12 is connected between anti-theft system 16 and sound emitter 18, as shown between alarm signal 20 and connector 22. Light transducer 14, as mentioned above, is also connected to control circuit 12. Light transducer 14 preferably comprises a cadmium sulfide photoresistor cell which is commercially available for generating an electrical signal in response to the intensity of light impinging upon it. The light sensor 14 is preferably mounted on the vehicle in a position which provides security, such as inside the vehicle, yet in a location, such as near the windshield or other window which provides a signal fairly representative of the ambient light level surrounding the vehicle.

Referring now to FIGS. 2 and 3, there is shown in further detail the components and operation of the apparatus 10 in accordance with the present invention. In particular, in FIG. 3 there is shown a circuit diagram in which the twelve (12) volt input alarm signal is connected at input terminal 28, which is correspondingly shown in FIG. 1, and the output signal from control circuit 12 to sound emitter 18 is generated at output terminal 30 of control circuit 12. The transducer signal input from the light transducer 14 is connected at point 32. Control circuit 12 basically comprises two portions or sections, namely switch portion 34 and switch portion 36. Switch portion 34 responds to whether the ambient light threshold is above or below a certain predetermined level, as indicated by transducer 14, and circuit portion 36 generates the output signal to the sound emitter 18. The output signal to emitter 18 is either a bypass signal which is identical to the signal at terminal 28, or a suppressed signal, which corresponds to the signal at terminal 28 except that the beginning portion of the signal has been suppressed for a predetermined amount of time.

Circuit portion 34 includes an integrated circuit or comparator 38 connected to a variable resistor 40 which is used to adjust the threshold level of the signal from photoresistor cell 42 which is connected to comparator 38. This adjustment can be accomplished by varying resistor 40 while observing LED 44 which is connected to resistor 46 to calibrate the threshold level. Photoresistor cell 42 is also connected in series to resistor 48 as shown. In the embodiment shown, resistor 48 is 100K ohms, resistor 38 of the integrated circuit switch is 3.3K ohms, and resistor 46 is 680 ohms.

Circuit portion 36 comprises a test lead 50 and further includes a delay circuit comprising capacitor 52 and resistor 54 in combination with transistor 56. In the preferred embodiment, capacitor 52 has a value of 470 micro farads, and resistor 54 has a resistance of 3.3K ohms. The twelve (12) volt input signal at input terminal 28 is grounded at ground 58. The duration of the suppression of input signal at terminal 28 is adjusted by varying the capacitor 52 and resistor 54 to achieve the desired amount of suppression for the desired interval. In the preferred embodiment, the arm and disarm chirp from a remote system of a conventional anti-theft system is approximately one to one and a half (1-1.5) seconds. Therefore, in the preferred embodiment shown, the suppression duration is adjusted so that the alarm input at signal 28 is suppressed for approximately two (2) seconds when suppression is to take place. This assures that the arm and disarm chirp signal at terminal 28 never reaches sound emitter 18. The operation of apparatus 10 can perhaps best be appreciated further with reference to FIG. 2.

In FIG. 2, the alarm signal input 60 which corresponds to input terminal 28 generates a twelve (12) volt alarm signal. The alarm signal can be the arm or disarm chirp, or a continuous intrusion alarm. The alarm signal is passed during normal operation to connection 62, as shown in circuit 12 of FIG. 3, which tests to determine whether the light threshold is greater than the predetermined amount of light which would represent the transition between darkness and daylight as desired. It could exclude, for example, the intensity of lights from a parking lot at night, and require substantially the equivalent of early morning or late afternoon daylight to activate control circuit 12. On receipt of an alarm signal at terminal 28, circuit portion 34 is energized to test the ambient light level as input by photoresistor cell 42. If comparator 38 indicates at step 64 that the ambient light is greater than the predetermined and calibrated threshold, as shown by logic path 66, i.e. daylight, the suppression delay function of circuit 12 is bypassed, and the alarm signal from terminal 28 is allowed to flow directly and immediately to the output terminal 30, which immediately energizes sound emitter 18 to sound the arm or disarm chirp, or alarm, as the case may be. In the event the ambient light is less than the predetermined threshold level as shown by path 68, the alarm signal from terminal 28 is directed through the circuit path portion 36 to suppress or interrupt at step 70 the beginning of alarm signal for a predetermined period of time or interval, e.g. two (2) seconds, as determined by capacitor 52 and resistor 54. Thus, during the time the signal is suppressed, there is no output from terminal 30, and no sound is emitted from sound emitter 18. After the suppression time interval, the signal then present at input terminal 28, if any, is allowed to pass to output terminal 30. If the input alarm signal at terminal 28 was the arm or disarm chirp, which lasts only one to one a half (1-1.5) seconds, it is since over, and there is no longer a signal present at terminal 18 after two (2) seconds. Thus, there is no signal passed from terminal 28 to terminal 30 to energize and emit sound from sound emitter 18 at alarm signal output 72. On the other hand, if the input signal is an intruder alarm signal typically of a much longer duration such as 2 to 3 minutes or more, after the suppression interval of two (2) seconds, the input signal still present at terminal 28 is allowed to pass to output terminal 30 to energize the sound emitter 18 and alert of an intrusion. The apparatus thus does not significantly interfere with the normal operation of the anti-theft system 16. In addition, the control circuit 12 is reset each time a new input signal appears at terminal 28.

While the particular apparatus as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

We claim:

1. An apparatus for automatically suppressing the audible arm and disarm signal of an automobile anti-theft system, comprising:
    circuit means having an input terminal for receiving an alarm signal from an alarm signal generating portion of said automobile anti-theft system, and having an output terminal for providing a modified alarm signal to a sound emitting device; and
    light sensing means coupled to said circuit means for generating a light level signal for indicating whether ambient light intensity is above or below a predetermined threshold level;
    said circuit means including bypass means responsive to said light level signal being above said threshold level for connecting said input terminal to said output terminal for allowing an alarm signal to energize said sound emitting device;
    said circuit means further including suppression means responsive to said light level signal being below said threshold level for disconnecting said input terminal from said output terminal for a predetermined period of time.

2. An apparatus for automatically suppressing the audible arm and disarm signal of an automobile anti-theft system as recited in claim 1, wherein said audible arm and disarm signal has a specified duration, and wherein said period of suppression is slightly longer than said specified duration.

3. An apparatus for automatically suppressing the audible arm and disarm signal of an automobile anti-theft system as recited in claim 2, wherein said alarm signal comprises either said audible arm and disarm signal having a specified duration of two seconds.

4. An apparatus for automatically suppressing the audible arm and disarm signal of an automobile anti-theft system as recited in claim 3, wherein said alarm signal comprises an intruder alarm signal.

5. An apparatus for automatically suppressing the audible arm and disarm signal of an automobile anti-theft system as recited in claim 1, wherein said bypass means comprises a comparator connected to said input terminal and said output terminal.

6. An apparatus for automatically suppressing the audible arm and disarm signal of an automobile anti-theft system as recited in claim 2, wherein said light sensing means comprises a cadmium sulfide photoresistor cell.

7. An apparatus for automatically suppressing the audible arm and disarm signal of an automobile anti-theft system as recited in claim 3, wherein said apparatus is mounted between said automobile anti-theft system and said sound emitting device mounted on a vehicle.

8. An apparatus for automatically suppressing the audible arm and disarm signal of an automobile anti-theft system as recited in claim 1, wherein said apparatus is integral with said automobile anti-theft system and said sound emitting device.

* * * * *